Aug. 20, 1935.   H. T. WHEELER   2,012,150
CONSTANT PRESSURE MULTISTAGE PACKING
Filed May 25, 1931   2 Sheets-Sheet 1

INVENTOR.
Harley Wheeler

Aug. 20, 1935.  H. T. WHEELER  2,012,150
CONSTANT PRESSURE MULTISTAGE PACKING
Filed May 25, 1931   2 Sheets-Sheet 2
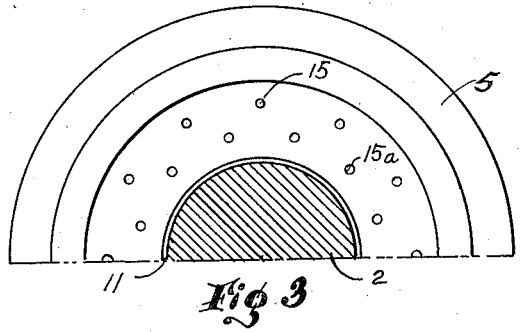
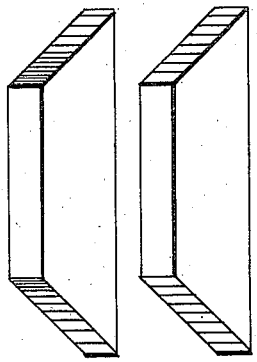
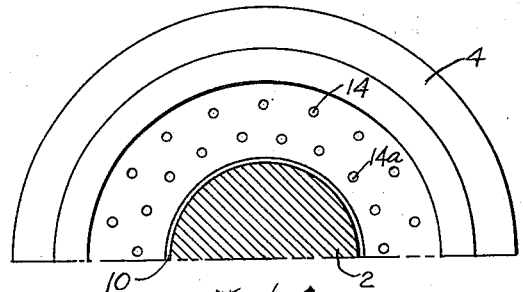
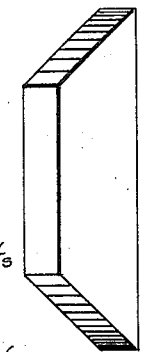
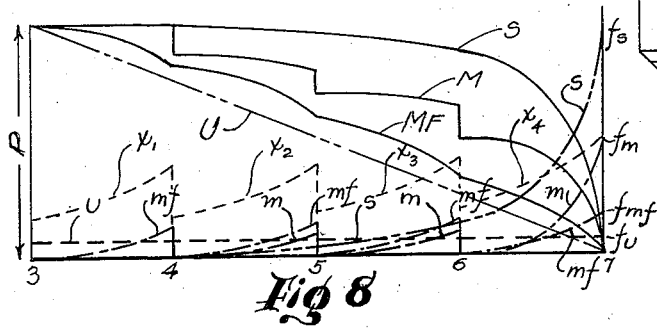
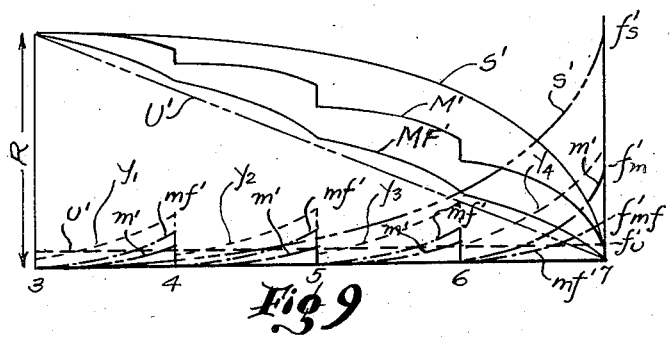
INVENTOR.
Harley T Wheeler Patented Aug. 20, 1935

2,012,150

UNITED STATES PATENT OFFICE 2,012,150

CONSTANT PRESSURE MULTISTAGE PACKING

Harley T. Wheeler, Dallas, Tex.

Application May 25, 1931, Serial No. 539,803

4 Claims. (Cl. 286—26)

This invention relates to the holding of constant high pressure by a multistage packing in a stuffing-box, and its chief advantage lies in a capability of regulating the seepage flow due to pressure so that saturation of the packing by the pressure will be at the lowest possible value.

Another advantage is that the highest as well as the lowest pressure ranges may be held with a uniform efficiency.

Still another advantage is that packing rings of different density may be used in this invention to regulate the flow of pressure thru the packing, thereby controlling to a great extent the amount of the friction of contact.

Still another and important advantage is that the packing is arranged to regulate the drop of pressure within the packing structure, at the same time regulating the seepage flow due to pressure, so that the friction of contact will be created uniformly over the area of contact.

With these objects and advantages in view, other desirable advantages of construction will be disclosed during the description, accompanied by the drawings, wherein:

Figure 3 is an upper half view of a compartment along the line 3—3 of Figure 1.

Figure 4 is an upper half view of a compartment along the line 4—4 of Figure 1.

Figure 5 is a diagrammatic cross-section of a cone-shaped packing ring, with the greatest density at the inner portions.

Figure 6 is a diagrammatic cross-section of a cone-shaped packing ring of uniform density.

Figure 7 is a diagrammatic cross-section of a cone-shaped packing ring with the greatest density near the outer portions.

Figure 8 is an internal pressure chart with the friction curves of the packing, using the inside density rings of Figure 5.

Figure 9 is an internal pressure chart with the friction curves of the packing, using the outside density rings of Figure 7.

Figure 1:
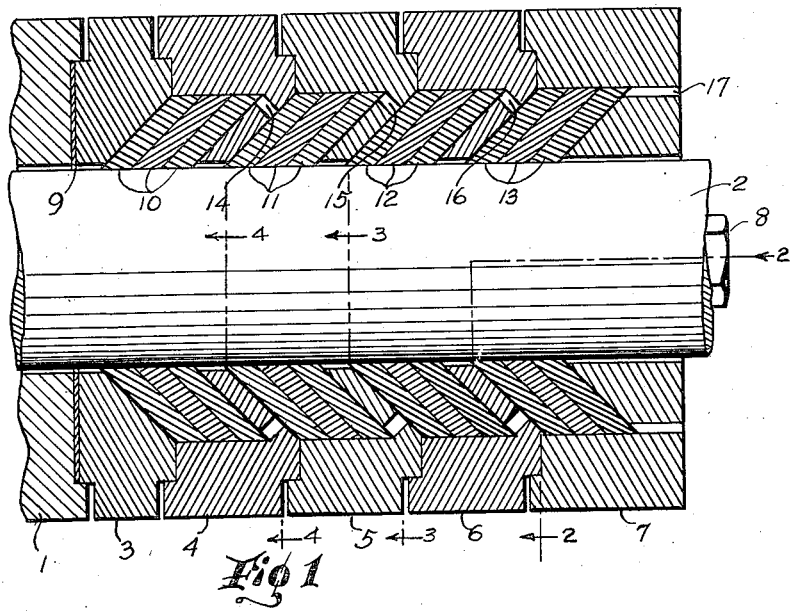
Figure 1 is a cross-section of the multistage packing built according to this invention.

Referring now especially to Figure 1, the body 1 is an extension of the machine frame thru which the shaft 2 extends and pressure exists in the clearance between the shaft 2 and the body 1. A series of cups, forming compartments between their confines, the face of each being pressure tight one with the other, are held by the bolts 8 concentric with the shaft 2 and pressure tight against the body 1 by means of the gasket 9. Within the confines of each compartment as formed are placed packing rings, as will now be described in detail.

The spacing ring 3 is adjacent to the gasket 9 and forms the inner seat of the cone-shaped packing rings 10. The cup 4 has a cone-shaped end-wall against which the packing rings 10 may rest while under pressure. The cup 5 has a cone-shaped end-wall against which the packing rings 11 may rest while under pressure. The cup 6 has a cone-shaped end-wall against which the packing rings 12 may rest while under pressure. The packing gland 7 has an inner cone-shaped seat against which the packing rings 13 may rest while under pressure. The spacing ring 3, the cups 4, 5, 6 and the packing gland 7 each have a clearance around the shaft to prevent contact. In the end-wall of the cup 4 is shown a series of outlets 14 for seepage to flow from the packing rings in the compartment between the cup 4 and the spacing ring 3 and into the next adjacent compartment. The seepage which would collect in the packing confined between the end-walls of the cups 4 and 5 is released thru the passages 15, and into the packing rings 12, and in turn is successively vented thru the passages 16, and finally flows to the atmosphere thru the passages 17 made in the face of the gland 7. It should be apparent that the cone-shaped end-walls of the spacing ring 3, the cups 4, 5, and 6 and the packing gland 7, form compartments of a definite size, in which the packing rings are confined, and that there is no adjustment after the assembly is placed against the body 1 of the machine.

Figure 2:
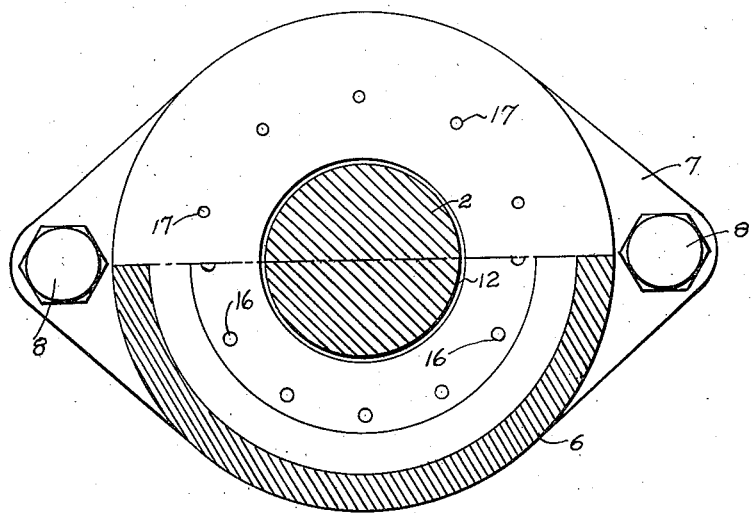
Figure 2 is an end view of the multistage packing with a partial cross-section along the line 2—2 of Figure 1.

Referring now to Figure 2, an end view of the cross-sectional assembly of Figure 1. The packing gland 7 is held to the machine frame by the bolts 8, 8 and the seepage passages 17, 17 are vents from the outer packing compartment. An end view of the outer cup 6 is shown in partial cross-section and along the line 2—2 of Figure 1. The seepage holes 16, 16 vent the pressure from the adjacent inner packing compartment. Around the shaft 2 is shown the fit of the packing rings 12.

In Figure 3 is indicated a half end view of the cup 5, along the lines 3—3 of Figure 1. It may be noted that the seepage passages 15 are of closer spacing than those of Figure 2, and that an inner row of passages 15a has been added, the reason for so doing will be explained later. The packing rings 11 are shown to be fitting the shaft 2.

In Figure 4 is indicated a half end view of the cup 4, along the line 4—4 of Figure 1. The seepage passages 14 are placed closer to each other than is shown in either of the Figures 2 and 3, and other passages 14a are added. The packing rings 10 are shown to be fitting the shaft 2.

As will afterward be explained, controlling the reaction of the packing to the impressed pressure, necessitates a type of packing ring suitable to the condition. In Figure 5 is a packing ring made so that the density of its structure increases toward the center of the cone-shape and is a maximum at the contacting surface of the shaft, and corresponds to those rings made by the process described in my application for Letters Patent, Serial Number 509,622, dated January 19, 1931, now Patent No. 1,978,240, issued October 23, 1934. Figure 6 is a cone-shaped packing ring of uniform density. In Figure 7 is another type of packing ring in which the density increases toward the periphery and is a maximum at the contact with the stuffing-box wall, and corresponds to those rings made according to my application for Letters Patent, Serial Number 515,232, dated February 12th, 1931.

Referring now to my application for Letters Patent, Serial Number 537,658, dated May 15, 1931, "The elasticity of porous elastic structures," in which twenty-four laws of friction are described and related to the density and porosity of packing rings is set out. A fibrous packing, such as is intended for use in this invention is a porous structure, becoming elastic when exposed to pressure. A structure which is porous is defined as an assembly of packing rings having pores, interstices and joints thru which pressure may pass. The chief advantage of a porous structure lies in its capability of gradually reducing an impressed pressure to a lower level, thereby distributing the drop of pressure along the area of contact between the packing and the shaft, thus in turn distributing the friction necessary to seal the pressure. It is proven by the first and second laws before mentioned, that the thrust of the packing structure against the shaft is equal to the drop of pressure at any point, and that the amount of friction on any increment of contact surface is that proportion of the total friction which is related to the proportion of pressure drop within that increment. Thus for a single set of packing having no dividing walls, the greatest portion of the friction occurs in a small length of the contact, farthest from the source of pressure.

The coefficient of friction is taken to be the relation of the normal applied pressure to the force necessary to move the shaft. Considering a single set of packing with most of the measured friction occurring on a small area, the coefficient for the unit of area will be very high, causing heat and rapid wear within a limited region. The purpose of this invention is not especially to reduce the total measured friction necessary to seal off the pressure, but to distribute the latter quantity so that all of the area in contact does an equal share in creating the friction, which means a uniform distribution of wear and an equal radiation of temperature by a controlled seepage flow.

Referring now to Figure 8, an internal pressure chart, the ordinates being to a scale and being the constant pressure P impressed on the packing set of Figure 1, and the abcissa to a scale being the actual length of the packing surface in contact with the shaft 2 of Figure 1. The divisional points on the chart, 3, 4, 5, 6, and 7, represent the confines of the compartments formed by the corresponding cups and retainers 3, 4, 5, 6, and 7 of Figure 1. The dotted line U is the ideal pressure drop thruout the length of the packing which will qualify any packing structure for the twenty-fourth law of friction, that friction is independent of the area of contact, when the normal applied pressure is equal at all points of the contact.

First, the packing as shown in Figure 1 is considered to be a single set, that is, the division walls are assumed to be removed from Figure 1, the packing rings being adjacent to each other. The packing is therefore subject to a continual seepage flow under the constant impressed pressure, according to the line S of Figure 8, the line S being the actual pressure at any point along the contact surface. It may be observed that the greatest rate of pressure drop is close to the packing gland, at which location most of the friction occurs. To demonstrate the distribution of the friction per increment of length according to the pressure line S, the amounts of friction are plotted on the abcissa of the internal-pressure chart, the total friction being assumed to be F, a concrete quantity. The rate of pressure drop is taken for increments of length from the curve S and the proportional value of the total friction F solved for, resulting in the friction curve s, starting at the point 4 as the internal pressure is not reduced up to this point, and ending at point $f_s$. The area of contact between the points 6 and 7 is therefore subjected to most of the strain, resulting in high temperature locally and rapid wear, and giving a high coefficient of friction due to the low porosity of the structure, it being compressed by the accumulated thrust. This is the condition of all single sets of fibrous packing.

The condition inherent with the drop of pressure is that there must be seepage flowing thru the packing structure, however minute the necessary amount may be, for when the internal pressure becomes equalized in a packing structure, the effect is the same as replacing the packing gland 7 of Figure 1 with a tight gasket, eliminating the ability of the packing to react against the pressure. An examination of the first and second laws of friction indicates that when some mechanical means is provided to induce a drop of pressure at various intervals along the area of contact that the friction will be distributed over a greater area than is possible with a single set of packing. Referring again to Figure 1, the end-walls of the cups 4, 5 and 6 and the seat in the packing gland 7 provide the partitions necessary to realize a pressure drop at four points, instead of the one point of a single set which is the packing gland face. (As yet no consideration is being given to the seepage passages made thru the aforesaid end-walls.)

The use of partitioning walls between packing sections may be termed true multistaging, each compartment being separate and the only communicating passageway being the clearance between the end-walls of the compartments and the shaft. Reference is again made to Figure 8, the effect of multistaging being shown by the internal pressure line M, only the friction arising from the drop of pressure being considered. Applying the first and second laws of friction only, the friction is now found to be distributed between three compartments, appearing in compartment 4—5, also in 5—6 and in 6—7, the value $f_m$ being about one-half the value $f_s$ of a single set. Up to this point, theoretically it is apparent that the maximum friction per unit of area has been reduced by true multistaging and that temperature and wear should be reduced as compared to a single set of packing.

Contrasting the foregoing theory is the practical fact that a true multistage does not operate according to the first and second laws of friction. It has been found that for a considerable time after a true multistage packing is put into operation that it produces a great amount of heat accompanied by a severe wearing of the shaft, the effect starting at the inner compartment, passing to the next, and so on thruout the length of contact, failing in service when the last compartment of packing cannot hold the pressure. In Figure 8, the theoretical lines of friction as derived, $m$, $m$, $m$ and $m$ do not obtain, but that friction lines $x_1$, $x_2$, $x_3$ and $x_4$ are the actual relations of contact, as will now be explained.

As soon as pressure is impressed on the packing set of Figure 1, the packing in the compartment between pieces 3 and 4 is saturated, the volume of occupancy immediately increases, and as the packing rings are in a confined space they are compressed, the porosity is decreased, the seepage flow reduced and the friction of contact increases so that practically all of the pressure is held by the inside compartment. The consequence is that the shaft is worn quickly and the packing rings in the compartment are worn off at their edges of contact, the first compartment of packing starts to leak, whereupon the second compartment becomes saturated and the packing expands, giving the friction line $x_2$. In like manner each succeeding compartment becomes saturated as shown by the lines $x_3$ and $x_4$. After the outer and last compartment is worn and begins to leak, the life of the packing and shaft is exhausted as the pressure cannot be held.

Referring again to Figure 1, the interposition of the compartment end-walls interferes with the seepage flow that existed in the packing as a single set, the direction and location of the flow being constricted to the clearances betwen the end-walls and the shaft. The amount of the flow is also diminished because the porosity of the packing rings as constructed according to Figure 5 is less at the point of contact with the shaft and is further restricted by the lowering of the porosity due to the reaction of the packing against the pressure. It should be apparent that dividing the packing into compartments, thus decreasing the number of paths of the seepage flow as well as the amount of flow, subjects the packing successively in each compartment to the maximum effect of saturation by pressure, bringing about an increase of volume, forcing the rings against the shaft to cause excessive heat and wear until the volume of the packing is reduced to correspond to the saturation condition obtaining. In the meantime the shaft is worn, the packing damaged and the multistage will continue to operate for a time as long as the temperature and pressure remain constant, but will leak badly when idle or while being put into service with varying conditions to contend with. This series of conditions is expressed by the sixth, seventh, ninth and tenth laws of friction, which state that the volume of occupancy varies according to the rate and amount of the seepage flow, the friction created being in relation to the density and porosity of the structure as it is affected by the changes of volume.

It should be apparent that to design a porous packing structure to conform but to part of the laws and relations obtaining, is to make an impractical and troublesome device; sealing pressure by an excess of friction thru the medium of saturation is undesirable.

As the flow of seepage thru a porous elastic structure is the fundamental reason why the packing reacts against and will seal off the impressed pressure, it should be apparent that whatever changes in design are made to distribute the friction of contact, the seepage flow must also be considered as a part of the changes made and must not be restricted in a way to increase the friction. Referring again to Figure 1, the series of seepage passages, 14, 15, 16 and 17 provide ample means for the circulation of pressure, thus decreasing the effect of saturation to the same value as existed in the single set before mentioned. By partitioning the packing into compartments, the desired feature of the distribution of friction is secured, as shown by the internal pressure line MF of Figure 8, the effect of saturation being reflected by the difference between the lines U and MF, it not being practically possible to eliminate all saturation owing to the inequalities of the porosity of any packing structure. The friction lines $mf$, $mf$, $mf$ and $mf$ appear in each compartment having a maximum value of $f_{mf}$, very closely approximating the line of ideal friction $u$, of a constant value $f_u$. To obtain the maximum seepage flow in the compartment adjacent to the impressed pressure, the seepage passages are increased in number and in total area as shown by Figure 4, being decreased in number and total area as the packing is farther from the source of pressure, as respectively shown by Figures 3 and 2.

In designing multistages to meet the various conditions of temperature, the harshness of contact due to packing material in the presence of certain liquids and gases, high speeds and the like, the importance of the amount and of the location of the seepage flow as a means to remove the materials which have been heated, becomes of further importance. While it has been shown that the multistage as constructed according to this invention will obtain a uniform distribution of friction, it should also be apparent that the packing rings could be constructed of such a density and porosity as to prevent the mechanical relations of the multistage from operating. That is, the construction of the packing is equally important in producing a uniform drop of pressure, as are the provisions in the multistage end-walls for transferring the seepage after it has flowed thru the packing structure. The multistage as herein constructed is of little benefit unless the packing structure is made in harmony.

In Figure 9 is shown the relations of pressure and friction due to a packing structure having its greatest density at the stuffing-box wall contact and as described in Figure 7. The ordinates to a scale are the impressed pressure R, assumed to be considerably higher than the pressure P of Figure 8. The abcissa to a scale are the actual lengths of the packing contact, the points 3, 4, 5, 6 and 7 representing the confines of the compartments formed by the corresponding cups and retainers 3, 4, 5, 6 and 7 of Figure 1. The packing is first considered to be a single set, there being no end-walls as shown in Figure 1, each packing ring being in contact with another ring. Returning to Figure 9, the internal pressure line S' shows a drop of pressure starting at point 3, due to the increased porosity, and the friction line $s'$ derived from the internal pressure relations by the first and second laws of friction, starts at the point 3, continuing to a maximum value $f'_s$. The slope of the line $s'$ in the area 6—7 is less than that of the line $s$ of Figure 8, due to the higher rate of seepage flow, indicating that seepage can control the friction to some extent according to the sixth law which is, that for a constant pressure, friction is inversely proportional to the degree of porosity.

Returning now to Figure 1, the end-walls of the cups and retainers are assumed to be used, the packing being divided into four compartments but without any seepage passages. The internal pressure line M' shows an immediate drop in the compartment 3—4 as the increased degree of porosity at the surface of contact permits a considerable flow of seepage. This is reflected in the friction lines $m'$, $m'$, $m'$ and $m'$ appearing in each compartment with a maximum value of $f'_m$, much less than the value $f'_s$ of the single set, and if reduced to the same scale, less than the value $f_m$ of Figure 8.

The effect of saturation on the type of packing structure shown in Figure 7 is less than that of Figure 5, as the clearance between the shaft and the end-walls of the compartments is adjacent to that portion of the packing structure having it greatest degree of porosity. Hence this multistage, when so equipped and when first placed in service will not heat so vigorously nor will there be as much wear on the shaft and the packing, as in the case cited under Figure 8. The friction lines $y_1$, $y_2$, $y_3$ and $y_4$ appearing successively in each compartment indicate less friction and an improvement over the corresponding case of Figure 8, due to increased seepage flow.

Referring again to Figure 1, the series of seepage passages 14, 15, 16, and 17 are considered to be added to the construction, thus establishing multiple paths for any seepage confined in the compartments, the result being the internal pressure line MF', and the corresponding friction lines $mf'$, $mf'$, $mf'$ and $mf'$ closely approximating the uniform friction line $u'$ of a constant value $f'_u$.

The multistage constructed according to this invention is solely for constant pressure, or pressure changing at such a rate that there will be at no point of the contact, an excess or an insufficient seepage flow. This multistage however, when designed for different ranges of pressures constant in value must be equipped with packing rings of suitable densities. For the lowest pressure range, the ring structure in Figure 5 gives the lowest friction and best operation. For the next higher pressure range, as well as conditions of increased speed, temperature and higher coefficients of friction due to harsh contacts of liquids and gases, the ring of uniform density as shown in Figure 6 is desirable to increase the flow of seepage. For extreme cases, the structure of Figure 7 still further increases the seepage flow and counteracts the increasing friction of contact and maintains a higher degree of porosity under reaction. These three general types of ring structure will meet all of the conditions of commercial application.

The application for Letters Patent, Serial Number 396,479, dated October 1st, 1929, my original fibrous packing multistage, is operative because the fit between the internal expanding ring and the stuffing-box wall permits the escape of sufficient seepage and the change of volume due to saturation is compensated for by a spring actuated collar. The application for Letters Patent, Serial Number 532,222, dated April 23rd, 1931, now Patent No. 1,996,779, issued April 9, 1935, is also operative because seepage may flow past the fit of the expanding ring and the stuffing-box wall, and the correction for volume is made from an external point. In the two foregoing types, some manual effort and judgement is necessary to correct the change of volume. In the type herein shown, the seepage flow as controlled by both the design of the multistage and by choice of the packing or correct porosity, automatically produces the reaction to pressure at an even rate over the entire area of contact, and is therefore an improvement on the previous inventions.

Thruout this specification, a cone-shaped packing ring has been used as the example of a porous elastic structure. However, any fibrous packing ring which reacts against pressure will operate in like manner to the cone-shape, tho at a different efficiency.

The object of multistaging a packing is to distribute friction over the entire area of contact. It should be apparent that this is automatically accomplished in this design. It should be further apparent that many variations of seepage flow can be utilized to control the friction between a shaft and a porous structure, made elastic by the impression of pressure, but such variations as are within the scope of the appended claims, I do claim:

1. A stuffing-box composed of a series of compartments having annular spaces therein and positioned around a rod subjected to pressure, said annular spaces separated by partitions integral with the walls of said compartments, rod packing positioned in said annular spaces and in contact with said rod, whereby a drop of pressure occurs in each compartment causing a thrust of the packing structure against each of said partitions, a plurality of small passages in the walls of said partitions to permit the flow of seepage from the packing in one annular space to that of an adjacent space to equalize the internal drop of pressures in said compartments, thereby equalizing the thrusts of said packing structures against said partitions.

2. A stuffing-box composed of a series of compartments positioned around a rod subjected to pressure, each of said compartments having a conically shaped depression at one end and a conically shaped projection at the other end forming an annular wall between each of said compartments, conically shaped packing rings being positioned in said compartments and in contact with said rod, and means including an opening through said annular wall to provide a flow of seepage thru the wall of each of said compartments away from said rod to equalize the thrusts of the packing structures against said partitions.

3. A stuffing box composed of a series of annular compartments positioned around a rod subjected to pressure, conically shaped partitions at the ends of said compartments, the smaller ends thereof being presented toward the fluid pressure, rod packing shaped to fit said compartments and confined therein, there being openings through said partition adjacent the outer wall away from said rod to provide a seepage of pressure across each compartment from the adjacent preceding one toward the source of pressure whereby said packing may seal against the impressed pressure.

4. A stuffing box composed of a series of compartments positioned around a rod subjected to pressure, partitions between each of said compartments forming a conically shaped depression at one end and a conically shaped projection at the other end, conically shaped packing rings positioned in said compartments and in contact with said rod, said partitions being constructed with openings therein away from said rod and decreasing in number away from the source of said pressure, to regulate the flow of seepage through each of said packing rings and said partitions thereby controlling the amount of friction created on said rod by the packing structure confined in each of said compartments.

HARLEY T. WHEELER.